(12) United States Patent
Gupta et al.

(10) Patent No.: US 11,405,931 B2
(45) Date of Patent: Aug. 2, 2022

(54) METHODS, SYSTEMS, AND COMPUTER READABLE MEDIA FOR PROVIDING FOR NETWORK SLICE MANAGEMENT USING FEEDBACK MECHANISM

(71) Applicant: Oracle International Corporation, Redwood Shores, CA (US)

(72) Inventors: Nitin Gupta, Bangalore (IN); Avinash Jha, Karnataka (IN); Venkatesh Aravamudhan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/712,973

(22) Filed: Dec. 12, 2019

(65) Prior Publication Data

US 2021/0185695 A1    Jun. 17, 2021

(51) Int. Cl.
*H04W 72/08*    (2009.01)
*H04W 24/10*    (2009.01)
*H04W 28/16*    (2009.01)

(52) U.S. Cl.
CPC ......... *H04W 72/087* (2013.01); *H04W 24/10* (2013.01); *H04W 28/16* (2013.01)

(58) Field of Classification Search
CPC .......................... H04W 16/08; H04W 72/0486
See application file for complete search history.

(56) References Cited

U.S. PATENT DOCUMENTS

2017/0303259 A1    10/2017   Lee et al.
2018/0316564 A1*   11/2018   Senarath ............. H04L 41/5006
(Continued)

FOREIGN PATENT DOCUMENTS

CN        109600262 A        4/2019
WO     WO 2017/032280 A1    3/2017
(Continued)

OTHER PUBLICATIONS

Commonly-Assigned, co-pending U.S. Appl. No. 16/676,006 for "Methods, Systems, and Computer Readable Media for Providing for Policy-Based Access and Mobility Management Function (AMF) Selection Using Network Slice Selection Assistance Information (NSSAI) Availability Information," (Unpublished, filed Nov. 6, 2019).

(Continued)

*Primary Examiner* — German Viana Di Prisco
(74) *Attorney, Agent, or Firm* — Jenkins, Wilson, Taylor & Hunt, P.A.

(57) ABSTRACT

A method for feedback-based network slice management includes steps performed at a network slice management function (NSMF) including at least one processor. The steps include subscribing, via a network data analytics function (NWDAF) subscription interface of the NSMF, directly with the NWDAF to create a subscription to be notified of network slice load information and specifying, as part of the subscription, network slice load information report generation criteria defined by the NSMF. The steps further include receiving, directly from the NWDAF, via the NWDAF subscription interface of the NSMF and in response to the NSMF-defined network slice load information report triggering criteria being met, network slice load information. The steps further include determining, based on the network slice load information, that a network slice resource allocation change is needed. The steps further include, in response to determining that a network slice resource allocation change is needed, dynamically changing the network slice resource allocation during operation of a network slice.

13 Claims, 10 Drawing Sheets

(56) References Cited

U.S. PATENT DOCUMENTS

| | | | |
|---|---|---|---|
| 2018/0317134 A1* | 11/2018 | Leroux | H04W 24/02 |
| 2018/0317163 A1 | 11/2018 | Lee et al. | |
| 2018/0332523 A1 | 11/2018 | Faccin et al. | |
| 2019/0124181 A1 | 4/2019 | Park et al. | |
| 2019/0141606 A1 | 5/2019 | Qiao et al. | |
| 2019/0207778 A1* | 7/2019 | Qiao | H04M 15/61 |
| 2019/0222489 A1 | 7/2019 | Shan et al. | |
| 2019/0274038 A1 | 9/2019 | Wu et al. | |
| 2019/0335392 A1 | 10/2019 | Qiao et al. | |
| 2019/0356558 A1* | 11/2019 | Han | H04L 41/5009 |
| 2019/0357301 A1 | 11/2019 | Li et al. | |
| 2020/0029200 A1 | 1/2020 | Yu et al. | |
| 2020/0044943 A1* | 2/2020 | Bor-Yaliniz | H04L 41/18 |
| 2020/0053617 A1 | 2/2020 | Park et al. | |
| 2020/0228420 A1* | 7/2020 | Dao | H04L 41/5032 |
| 2020/0314701 A1 | 10/2020 | Talebi Fard et al. | |
| 2020/0396678 A1 | 12/2020 | Lee et al. | |
| 2021/0051070 A1 | 2/2021 | Akman et al. | |
| 2021/0105638 A1* | 4/2021 | Al-Kanani | H04L 43/0817 |
| 2021/0112404 A1* | 4/2021 | Xin | H04W 8/18 |
| 2021/0136602 A1 | 5/2021 | Pokkunuri et al. | |

FOREIGN PATENT DOCUMENTS

| | | |
|---|---|---|
| WO | WO 2018/170135 A1 | 9/2018 |
| WO | WO 2019/154295 A1 | 8/2019 |
| WO | WO 2019/158737 A1 | 8/2019 |
| WO | WO 2019/158777 A1 | 8/2019 |
| WO | WO 2019/197883 A1 | 10/2019 |
| WO | WO 2021/091623 A1 | 5/2021 |

OTHER PUBLICATIONS

"3rd Generation Partnership Project; Technical Specification Group Core Network and Terminals; 5G System; Network Function Repository Services; Stage 3 (Release 16)," 3GPP TS 29.510, V16.1.1, pp. 1-150 (Oct. 2019).

"3rd Generation Partnership Project; Technical Specification Group Core Network and Terminals; 5G System; Network Data Analytics Services; Stage 3 (Release 16)," 3GPP TS 29.520, V16.1.0, pp. 1-54 (Sep. 2019).

"3rd Generation Partnership Project; Technical Specification Group Services and System Aspects; Management and orchestration; Provisioning; (Release 16)," 3GPP TS 28.531, V16.3.0, pp. 1-70 (Sep. 2019).

"3rd Generation Partnership Project; Technical Specification Group Services and System Aspects; Procedures for the 5G System (5GS); Stage 2 (Release 16)," 3GPP TS 23.502, V16.2.0, pp. 1-525 (Sep. 2019).

"3rd Generation Partnership Project; Technical Specification Group Services and System Aspects; System Architecture for the 5G System (5GS) Stage 2 (Release 16)," 3GPP TS 23.501, V16.2.0, pp. 1-391 (Sep. 2019).

"Oracle® Communications Network Slice Selection Function (NSSF) Cloud Native User's Guide," Oracle, Release 1.0, F16990-01, pp. 1-29 (Apr. 2019).

"3rd Generation Partnership Project; Technical Specification Group Services and System Aspects; Telecommunication management; Study on management and orchestration of network slicing for next generation network (Release 15)," 3GPP TR 28.801, V15.1.0, pp. 1-75 (Jan. 2018).

Mannweiler, "5G Mobile Network Architecture for diverse services, use cases, and applications in 5G and beyond Deliverable D2.2 Initial overall architecture and concepts for enabling innovations," H2020-ICT-2016-2, 5G-MoNArch, Project No. 761445, pp. 1-111 (Jun. 30, 2018).

Barmpounakis et al., "Data Analytics for 5G Networks: A Complete Framework for Network Access Selection and Traffic Steering," International Journal on Advances in Telecommunications, vol. 11, No. 3 & 4, pp. 101-114 (2018).

Saboorian et al., "Network Slicing and 3GPP Service and Systems Aspects (SA) Standard," IEEE Software Defined Networks, pp. 1-7 (Dec. 2017).

Foy et al., "Network Slicing—GPP Use Case draft-defoy-netslices-3gpp-network-slicing-02," Network Working Groups, pp. 1-14 (Oct. 16, 2017).

Rapporteurs and Volunteers, "5GS Open Topics Collection for SA2#122," 3GPP Draft; S2-174251 5GS-STATUS Track-Open TOPICS-V5 1 3, 3rd Generation Partnership Project (3GPP), vol. SA WG2, pp. 1-12, (May 15-19, 2017).

"3rd Generation Partnership Project; Technical Specification Group Core Network and Terminals; 5G System; Network Slice Selection Services; Stage 3 (Release 16)," 3GPP TS 29.531, VCT WG4, No. V16.0.0, pp. 1-53 (Sep. 23, 2019).

International Search Report and Written Opinion for International Patent Application No. PCT/US2020/051884, pp. 1-19, dated (Dec. 8, 2020).

Non-Final Office Action for U.S. Appl. No. 16/676,006 (dated Apr. 8, 2021).

Notification of Transmittal of the International Search Report and the Written Opinion of the International Searching Authority, or the Declaration for International Application No. PCT/US2020/064137 (dated Mar. 18, 2021).

"3rd Generation Partnership Project; Technical Specification Group Services and System Aspects; Study of Enablers for Network Automation for 5G (Release 16)," 3GPP TR 23.791, V16.2.0, pp. 1-124 (Jun. 2019).

Notice of Allowance and Fee(s) Due for U.S. Appl. No. 16/676,006 (dated Aug. 9, 2021).

* cited by examiner

US 11,405,931 B2

METHODS, SYSTEMS, AND COMPUTER READABLE MEDIA FOR PROVIDING FOR NETWORK SLICE MANAGEMENT USING FEEDBACK MECHANISM

TECHNICAL FIELD

The subject matter described herein relates to network slicing. More particularly, the subject matter described herein relates to methods, systems, and computer readable media for network slice management using a feedback mechanism.

BACKGROUND

In 5G telecommunications networks, a network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is a combination of IP address and port number on a network node that hosts a producer NF. Producer NFs register with a network function repository function (NRF). The NRF maintains an NF profile of available NF instances and their supported services. Consumer NFs can subscribe to receive information about producer NF instances that have registered with the NRF.

One example of an NF that provides services to user equipment (UE) devices, such as Internet of Things (IoT) devices, is the access and mobility management function or AMF. The AMF provides registration management, connection management, reachability management, mobility management, and other services for UE devices. The AMF serves as the point of contact between the radio access network and the remaining nodes in the 5G core network. The AMF also serves as the point of access to network slice services.

Network slicing is a service provided in 5G networks where network resources are logically allocated in portions or slices for use by UE devices. Each network slice may provide particular capabilities or services to a UE. A network slice instance is defined as a set of network functions and the resources for the network functions which are arranged and configured to form and meet a specific set of network requirements or characteristics. For example, a network slice instance for access network services may be resources of a virtualized g-Node B and AMF to provide access network services for a UE. A network slice instance for a core network service may include resources of a virtualized NRF and network exposure function (NEF) configured to provide core network services for a UE, such as an Internet of things (IoT) device.

The third-generation partnership project (3GPP) defines service orchestration procedures for the creation and modification of network slices. However, these procedures do not include a feedback mechanism to optimize utilization of network slice components after their creation. For example, 3GPP TR 28.801 defines a network slice instance (NSI) lifecycle, including slice creation, modification, and decommissioning. However, slice modification post-creation is performed based on input from the service consumer, rather than performance feedback regarding slice utilization or capacity.

Accordingly, there exists a need for methods, systems, and computer readable media for network slice management using a feedback mechanism.

SUMMARY

A method for feedback-based network slice management includes steps performed at a network slice management function (NSMF) including at least one processor. The steps include subscribing, via a network data analytics function (NWDAF) subscription interface of the NSMF, directly with the NWDAF to create a subscription to be notified of network slice load information and specifying, as part of the subscription, network slice load information report generation criteria defined by the NSMF. The steps further include receiving, directly from the NWDAF, via the NWDAF subscription interface of the NSMF and in response to the NSMF-defined network slice load information report triggering criteria being met, network slice load information. The steps further include determining, based on the network slice load information, that a network slice resource allocation change is needed. The steps further include, in response to determining that a network slice resource allocation change is needed, dynamically changing the network slice resource allocation during operation of a network slice.

According to another aspect of the subject matter described herein, subscribing directly with the NWDAF includes sending an Eventsubscription_Subscribe message from the NSMF to the NWDAF, where the Eventsubscription_Subscribe message includes event type, data selection, and trigger parameters for defining network slice load events that trigger reporting of the network slice load information to the NSMF.

According to yet another aspect of the subject matter described herein, the trigger parameters include parameters based on service level agreement (SLA) criteria.

According to yet another aspect of the subject matter described herein, receiving the network slice load information includes receiving real time load information indicating utilization of a network slice after creation of the network slice and independently of monitoring by a network slice service consumer.

According to yet another aspect of the subject matter described herein, determining that a network slice resource allocation change is needed includes comparing the network slice load information to an operator-defined threshold and determining that the network slice resource allocation change is needed if a network slice load level indicated by the network slice load information exceeds the threshold.

According to yet another aspect of the subject matter described herein, dynamically updating the network slice resource allocation includes generating and sending a network slice subnet instance change request to a network slice subnet management function (NSSMF) to effect the change in the network slice resource allocation.

According to yet another aspect of the subject matter described herein, A method for providing real-time feedback for network slice management is provided. The method includes steps performed at a network data analytics function (NWDAF) including at least one processor. The steps include receiving, directly from a network slice management function (NSMF) and via an NWDAF subscription interface of the NSMF, a message for creating a subscription to be notified of real-time, post-creation network slice load information and NSMF-defined criteria for triggering reporting of the network slice load information. The steps further include creating the subscription. The steps further include checking NSMF-defined criteria defined for subscriptions with respect to load information received from network functions (NFs) providing network slice services. The steps further include determining that an NSMF-defined criterion associated with one of the subscriptions is met. The steps further include, in response to determining that the NSMF-defined criterion associated with one of the subscriptions is met, communicating the load information directly to the NSMF.

According to yet another aspect of the subject matter described herein, receiving a message from an NSMF includes receiving an Eventsubscription_Subscribe message, where the Eventsubscription_Subscribe message includes event type, data selection, and trigger parameters for defining network slice load events that trigger reporting of the network slice load information to the NSMF.

According to yet another aspect of the subject matter described herein, creating the subscription includes creating an entry in a network slice analytics and subscription management database.

According to yet another aspect of the subject matter described herein, checking the NSMF-defined criteria includes accessing the entry in the network slice analytics and subscription management database and determining whether a network slice load information report triggering criterion associated with the entry has been met.

According to yet another aspect of the subject matter described herein, communicating the network slice load information directly to the NSMF includes transmitting an Eventsubscription_Notify message to the NSMF, where the Eventsubscription_Notify message includes the network slice load information.

According to yet another aspect of the subject matter described herein, a system for feedback-based network slice management, is provided. The system includes a network slice management function (NSMF) including at least one processor. The system further includes a network data analytics function (NWDAF) subscription interface implemented by the at least one processor for directly with an NWDAF to create a subscription to be notified of network slice load information and specifying, as part of the subscription, network slice load information report generation criteria defined by the NSMF, receiving, directly from the NWDAF, via the NWDAF subscription interface of the NSMF and in response to the NSMF-defined network slice load information report triggering criteria being met, network slice load information. The system further includes a network slice resource manager implemented by the at least one processor for determining, based on the network slice load information, that a network slice resource allocation change is needed, and, in response to determining that a network slice resource allocation change is needed, dynamically changing the network slice resource allocation during operation of a network slice.

According to yet another aspect of the subject matter described herein, the NWDAF subscription interface is configured to subscribe directly with the NWDAF by sending an Eventsubscription_Subscribe message from the NSMF to the NWDAF, where the Eventsubscription_Subscribe message includes event type, data selection, and trigger parameters for defining network slice load events that trigger reporting of the network slice load information to the NSMF.

According to yet another aspect of the subject matter described herein, the NWDAF subscription interface is configured to receive real time load information indicating utilization of a network slice after creation of the network slice and independently of monitoring by a network slice service consumer.

According to yet another aspect of the subject matter described herein, the network slice resource manager is configured to determine that a network slice resource allocation change is needed by comparing the network slice load information to an operator-defined threshold and determining that the network slice resource allocation change is needed if a network slice load level indicated by the network slice load information exceeds the threshold.

According to yet another aspect of the subject matter described herein, the network slice resource manager is configured to dynamically update the network slice resource allocation by generating and sending a network slice subnet instance change request to a network slice subnet management function (NSSMF) to effect the change in the network slice resource allocation.

According to yet another aspect of the subject matter described herein, a system for providing real-time feedback for network slice management is provided. The system includes a network data analytics function (NWDAF) including at least one processor. The system further includes a network slice load information subscription manager for receiving, directly from a network slice management function (NSMF) and via an NWDAF subscription interface of the NSMF, a message for creating a subscription to be notified of real-time, post-creation network slice load information and NSMF-defined criteria for triggering reporting of the network slice load information and creating the subscription. The system further includes a network slice load information analytics engine for checking NSMF-defined criteria defined for subscriptions with respect to load information received from network functions (NFs) providing network slice services, determining that an NSMF-defined criterion associated with one of the subscriptions is met; and, in response to determining that the NSMF-defined criterion associated with one of the subscriptions is met, communicating the load information directly to the NSMF.

According to yet another aspect of the subject matter described herein, the network slice load information subscription manager is configured to receive an Eventsubscription_Subscribe message, where the Eventsubscription_Subscribe message includes event type, data selection, and trigger parameters for defining network slice load events that trigger reporting of the network slice load information to the NSMF.

According to yet another aspect of the subject matter described herein, the network slice load information subscription manager creates the subscription by creating an entry in a network slice analytics and subscription management database.

According to yet another aspect of the subject matter described herein, the network slice load information analytics function is configured to check the NSMF-defined criteria by accessing the entry in the network slice analytics and subscription management database and determining whether a network slice load information report triggering criterion associated with the entry has been met.

According to yet another aspect of the subject matter described herein, the network slice load information analytics engine is configured to communicate the network slice load information directly to the NSMF by transmitting an Eventsubscription_Notify message to the NSMF, where the Eventsubscription_Notify message includes the network slice load information.

According to yet another aspect of the subject matter described herein, a non-transitory computer readable medium having stored thereon executable instructions that when executed by a processor of a computer control the computer to perform steps is provided. The steps include subscribing, via a network data analytics function (NWDAF) subscription interface of a network slice management function (NSMF), directly with the NWDAF to create a subscription to be notified of network slice load information and specifying, as part of the subscription, network slice load information report generation criteria defined by the NSMF. The steps further include receiving, directly from the NWDAF, via the NWDAF subscription interface of the NSMF and in response to the NSMF-defined network slice load information report triggering criteria being met, network slice load information. The steps further include determining, based on the network slice load information, that a network slice resource allocation change is needed. The steps further include, in response to determining that a network slice resource allocation change is needed, dynamically changing the network slice resource allocation during operation of a network slice.

According to yet another aspect of the subject matter described herein, a non-transitory computer readable medium having stored thereon executable instructions that when executed by a processor of a computer control the computer to perform steps is provided. The steps include receiving, directly from a network slice management function (NSMF) and via a network data analytics function (NWDAF) subscription interface of the NSMF, a message for creating a subscription to be notified of real-time, post-creation network slice load information and NSMF-defined criteria for triggering reporting of the network slice load information. The steps further include creating the subscription. The steps further include checking NSMF-defined criteria defined for subscriptions with respect to load information received from network functions (NFs) providing network slice services. The steps further include determining that an NSMF-defined criterion associated with one of the subscriptions is met. The steps further include, in response to determining that the NSMF-defined criterion associated with one of the subscriptions is met, communicating the load information directly to the NSMF.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
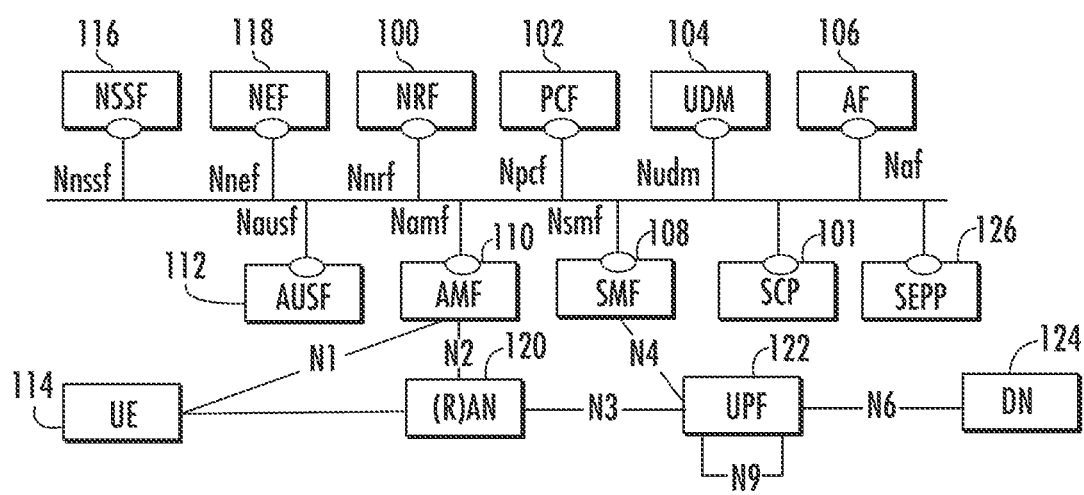
FIG. 1 is a network diagram illustrating an exemplary 5G network architecture.

FIG. 1 is a block diagram illustrating an exemplary 5G system network architecture. In FIG. 1, the network includes NRF 100 and a service communications proxy (SCP) 101. As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. In addition, SCP 101 may perform load balancing of connections between consumer and producer NFs.

NRF 100 is a repository for NF profiles. In order to communicate with a producer NF, a consumer NF or an SCP must obtain the NF profile from NRF 100. The NF profile is a JavaScript object notation (JSON) data structure. The NF profile definition includes at least one of a fully qualified domain name (FQDN), an Internet protocol (IP) version 4 (IPv4) address or an IP version 6 (IPv6) address.

In FIG. 1, any of the nodes (other than SCP 101 and NRF 100) can be either consumer NFs or producer NFs, depending on whether they are consuming or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between AMF 110 and PCF 102. AMF 110 performs mobility and registration management operations similar to those performed by a mobility management entity (MME) in 4G networks. AMF 110 also serves as the access point for network slice services. AMF 110 may also perform AMF selection to select the serving AMF that will provide access to the network slice services requested by a UE during registration.

An authentication server function (AUSF) 112 performs authentication services for user equipment (UEs), such as UE 114, seeking access to the network.

A network slice selection function (NSSF) 116 provides network slice subnet availability information (NSSAI) and NS selection services for devices seeking to access specific network capabilities. NSSF 116 may obtain AMF loading information from an NRF and NSSAI availability information from AMFs. NSSF 116 may store the AMF loading information and NSSAI availability information in an AMF selection database maintained by NSSF 116. When NSSF 116 receives an NSSAI selection request from an AMF, NSSF 116 may utilize the stored AMF loading and NSSAI availability information to compute an AMF relevance score and a weight for each AMF capable of supporting the network slice services requested by a UE seeking access to network slice services. NSSF 116 may generate a prioritized list of AMFs capable of providing the requested services and the corresponding weights and communicate the list to the requesting AMF. The requesting AMF may then use the prioritized list of AMFs and the weights to select an AMF for providing access to the requested network slice services.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionalities for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse a minimum of two SEPP functions, one for the home PLMN and the other for the foreign PLMN.

As indicated above, network slicing involves providing virtual network functions and allocating resources for the virtual network functions to meet a given requirement. For example, network slicing may involve virtualizing any of the network functions illustrated in FIG. 1 and providing access to services implemented by multiple different network functions as a network slice instance.

At the highest level, network slices are accessible via communication services provided by a communication service provider. Communication services can include business to consumer communication services, such as mobile web browsing, voice over LTE calling, and rich communication services.

Communication services can also include business to business services, such as Internet access and local area network (LAN) interconnection.

Network slice as a service can be offered by communication services providers to their customers. Network slice services can be characterized by a number of parameters, including:
  radio access technology;
  bandwidth;
  end-to-end latency;
  guaranteed/non-guaranteed QoS;
  security level, etc.

Figure 2:
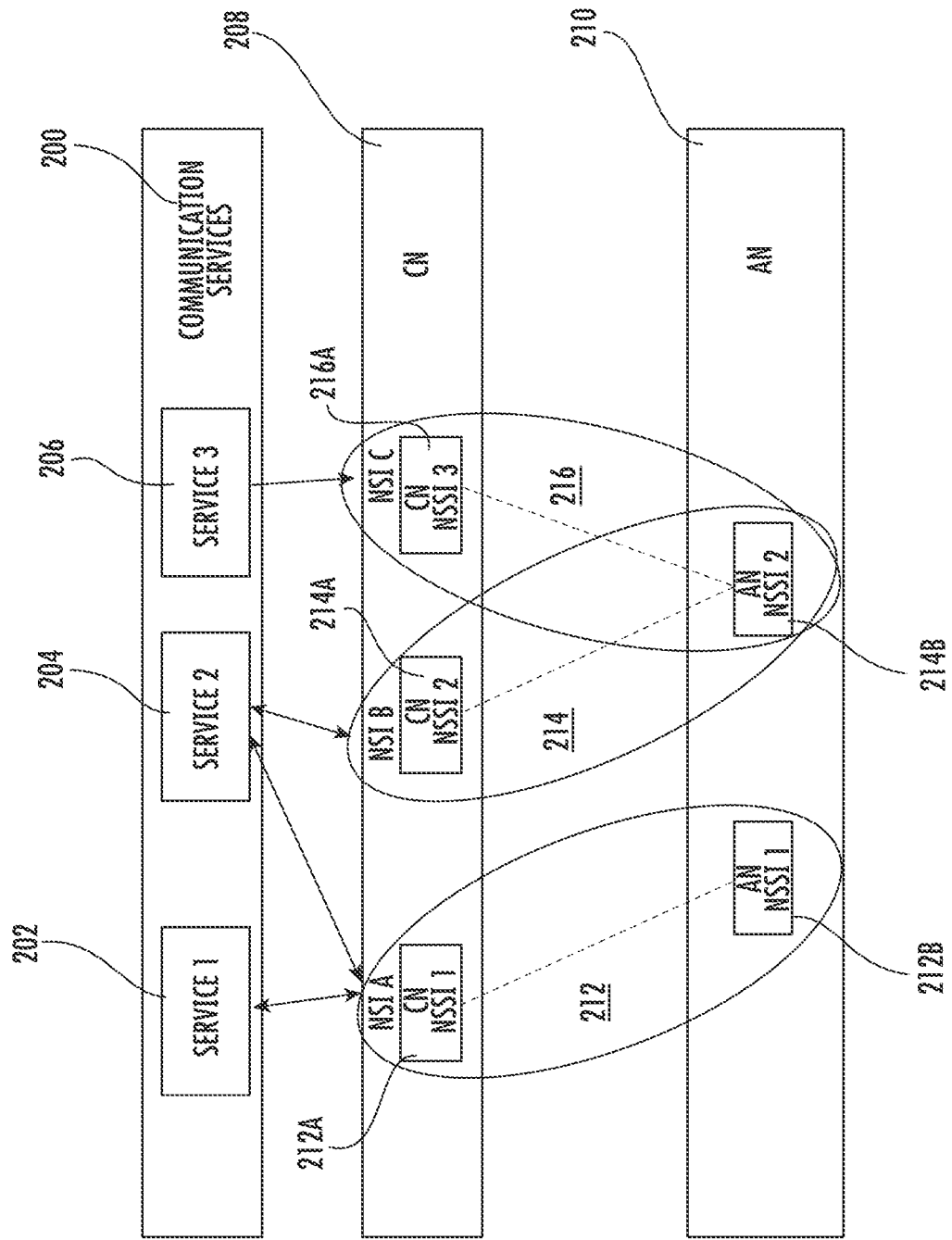
FIG. 2 is a network diagram illustrating exemplary relationships between network communication service, core network resources, access network resources, network slice instances, and network slice subnet instances

FIG. 2 illustrates an example of the relationship between communication services, network slice instances (NSIs), network slice subnet instances (NSSIs), the core network (CN), and the access network (AN). Referring to FIG. 2, communication services 200 provided by a communication service provider include service 1 202, service 2 204, and service 3 206. Each of service 1 202, service 2 204, and service 3 206 is implemented using a network slice instance consisting of virtual NF resources in core network 208 and access network 210. In the illustrated example, service 1 202 is implemented using network slice instance A 212. Network slice instance A 212 is implemented using core network NSSI 1 212A and access network NSSI 1 212B. Service 2 204 is implemented using network slice instance B 214. Network slice instance B 214 is implemented using core network NSSI 2 214A and access network NSSI 2 214B. Service 3 206 is implemented using network slice instance C 216. Network slice instance C 216 is implemented using core network NSSI 3 216A and access network NSSI 2 214B. It should be noted that access network NSSI 2 214B is shared by network slice instances 214 and 216.

Figure 3:
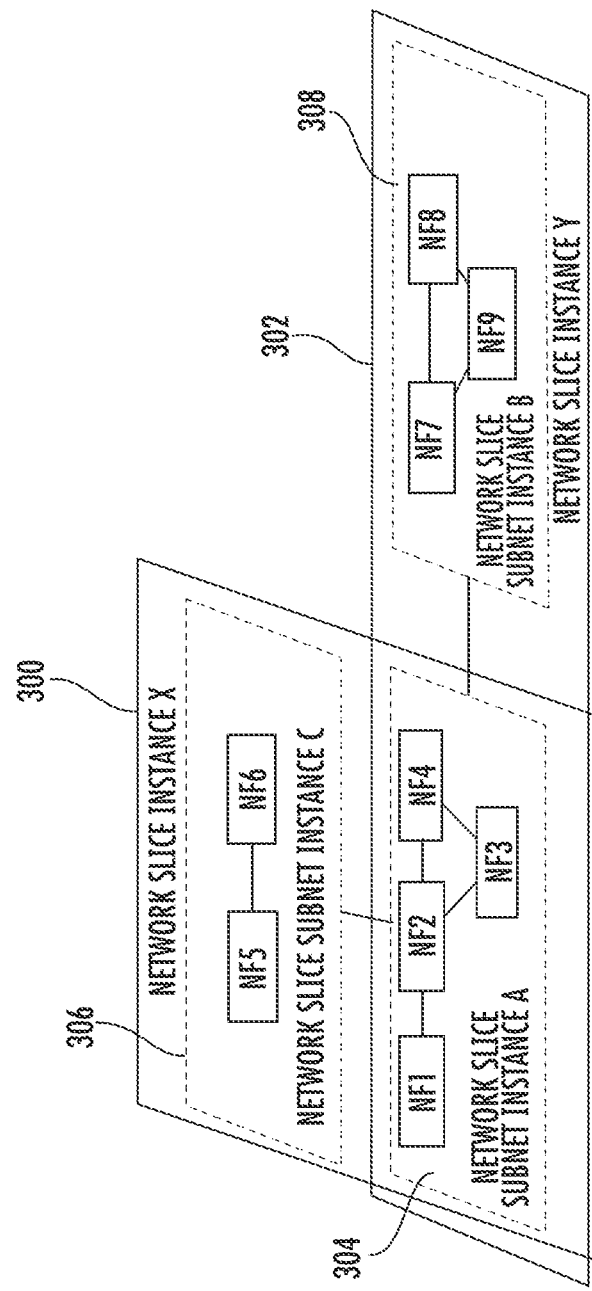
FIG. 3 is a network diagram illustrating exemplary relationships between network slice instances, network slice subnet instances, and network functions.

FIG. 3 is a network diagram illustrating exemplary relationships between network slice instances, network slice subnet instances, and network functions. In FIG. 3, network slice instance X 300 and network slice instance Y 302 are illustrated. Network slice instance X 300 includes network slice subnet instance A 304 and network slice subnet instance C 306. Network slice instance Y 302 includes network slice subnet instance B 308 and network slice subnet instance A 304, which is shared with network slice instance Y 302. Network slice subnet instance A 304 includes NFs NF1-NF4. Network slice subnet instance C 306 includes NFs NF5 and NF6. Network slice subnet instance C 306 includes NFs NF7-NF9. Thus, FIG. 3 further illustrates the concept of sharing network slice subnet instances and corresponding NF resources between network slice instances.

Figure 4:
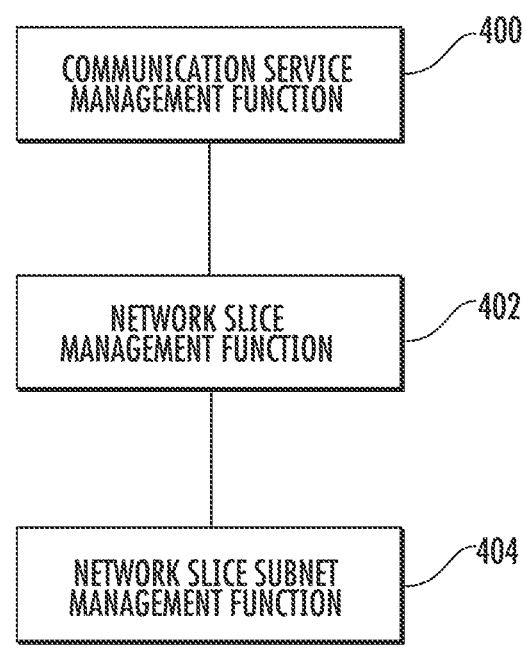
FIG. 4 is a network diagram illustrating an exemplary management structure for communication services, network slices, and network slice subnets.

In order to manage communication services, network slice instances, and network slice subnet instances, 3GPP TR 28.801 defines three management functions, the communication service management function (CSMF), the network slice management function (NSMF), and the network slice subnet management function (NSSMF). These functions are illustrated in FIG. 4. In FIG. 4, CSMF 400 is the highest-level node in the management hierarchy and is responsible for translating communication-service-related requirements to network-slice-related requirements and for communicating with NSMF 402. NSMF 402 is the next-level node in the hierarchy and is responsible for management and orchestration of network slice instances. NSMF 402 also derives network-slice-subnet-related requirements from networkslice-related requirements. NSMF 402 communicates with CSMF 400 and the NSSMF 404. The lowest-level node in the management hierarchy is NSSMF 404. NSSMF 404 is responsible for the management and orchestration of network slice subnet instances. NSSMF 404 communicates with NSMF 402 and with the NFs that implement network slice subnet instances.

Figure 5:
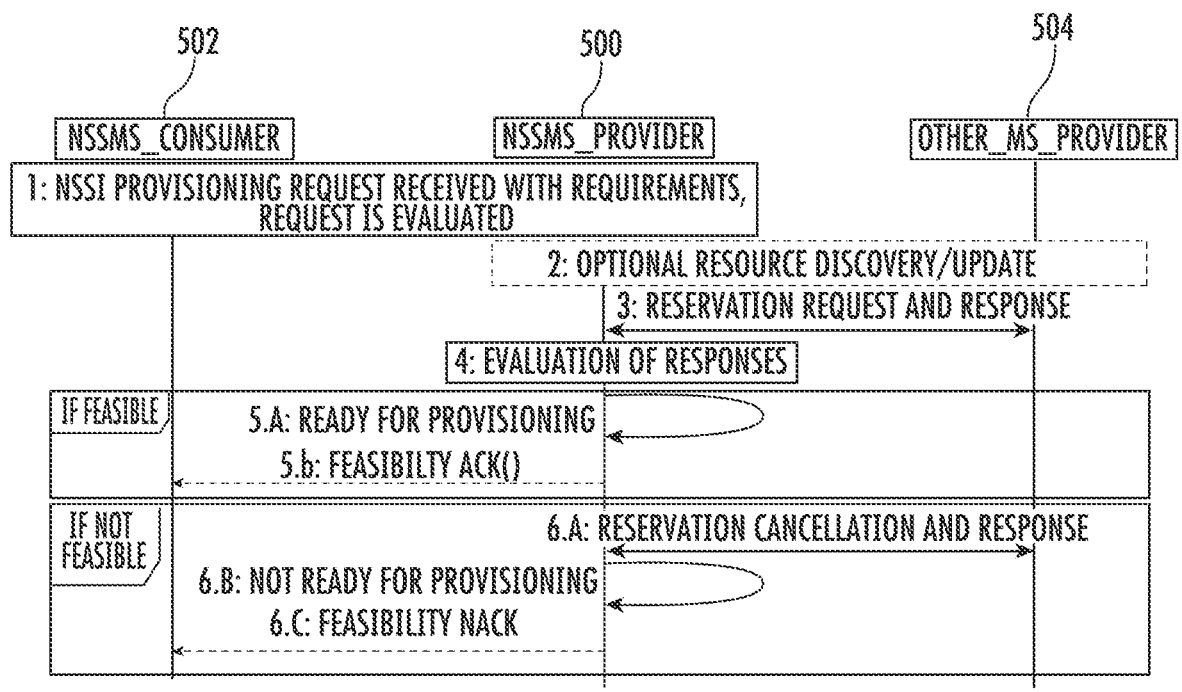
FIG. 5 is a message flow diagram illustrating exemplary messaging initiated by a network slice services consumer for checking feasibility of provisioning resources for a network slice.

3GPP TS 28.531 defines procedures for network slice service consumers to request creation, deletion, and check the feasibility of network slice instances and network slice subnet instances. The procedure defined for a network slice feasibility check by a network slice management service provider is illustrated in FIG. 5. Referring to FIG. 5, in line 1, a Network Slice Subnet Management Service Provider (NSSMS_Provider) 500 receives a provisioning NSSI request (e.g., AllocateNssi request or ModifyNssi request) from Network Slice Subnet Management Service Consumer (NSSMS_Consumer) 502 with network-slice subnet-related requirements (e.g. area information, user number, traffic demand, QoS quality, whether the requested network slice instance can be shared). The request is evaluated and initial resources to be allocated are identified. NSSMS_Provider 500 may be NSMF 402 and NSSMS_Consumer 502 may be CSMF 400 described above with respect to FIG. 4.

In line 2 of the message flow diagram in FIG. 5, NSSMS_Provider 500 may optionally request information and updates from Other_MS_Provider 504 regarding the resources. Other_MS_Provider 504 may be an NSMF in another network.

In line 3 of the message flow diagram, NSSMS_Provider 500 sends reservation requests to Other_MS_Provider 504, e.g., management and orchestration (MANO), TN manager. NSSMS_Provider 500 receives responses with information regarding reserved resources, e.g., their availability, identification information of reserved resources and so on.

In line 4 of the message flow diagram, NSSMS_Provider 500 evaluates the responses to determine if the network slice subnet requirements can be satisfied.

Lines 5a and 5b of the message flow diagram are executed by NSSMS_Provider 500 if the allocation of network resources is determined to be feasible. In line 5a, NSSMS_Provider 500 determines that it is ready for provisioning the required network slice resources. In line 5b of the message flow diagram, NSSMS_Provider 500 optionally sends a feasibility acknowledgement message to NSSMS-_Consumer 502 indicating that the requested resources are available.

Lines 6a-6c of the message flow diagram are executed if NSSMS_Provider 500 determines that the requested allocation of resources is not feasible. In line 6a, NSSMS_Provider 500 cancels reservations and optionally may receive acknowledgements. In line 6b, NSSMS_Provider 500 determines that it is not ready for provisioning the requested network slice resources. In line 6c, NSSMS_Provider 500 optionally sends a negative acknowledgement regarding results of the reservation check to NSSMS_Consumer 502.

Thus, FIG. 5 illustrates a network-slice-consumer-driven feasibility check of network slice resources. These steps are initiated by the network slice consumer and are executed prior to network slice resource allocation. What is needed is a network-slice-management-function-driven procedure, independent of monitoring requests from the network slice consumer for monitoring and modifying network slice and network slice subnet resources.

Figure 6:
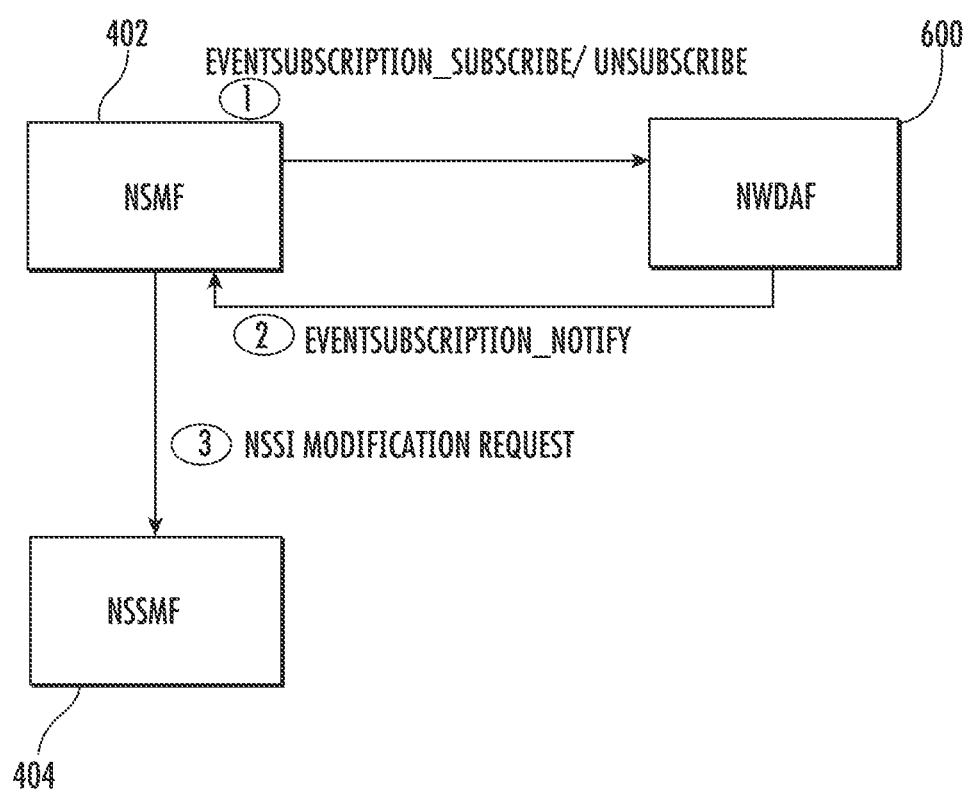
FIG. 6 is a message flow diagram illustrating exemplary messaging exchanged between a network slice management function, a network data analytics function, and a network slice subnet management function in obtaining feedback regarding network slice utilization and using the feedback to modify a network slice subnet instance.

FIG. 6 is a diagram illustrating a procedure implemented by the NSMF for obtaining network slice load information from a network data analytics function (NWDAF), after creation of a network slice instance, dynamically during operation of the network slice instance, and independently of (i.e., without receiving a monitoring request from) a network slice services consumer. Referring to FIG. 6, in line 1 of the message flow diagram, NSMF 402 sends an Eventsubscription_Subscribe/Unsubscribe message to NWDAF 600. In this example, it is assumed that the message is an Eventsubscription_Subscribe message. The Eventsubscription_Subscribe message is used by NSMF 402 to subscribe to receive information regarding the real-time, instantaneous load level of a network slice. Exemplary parameters that can be included in the event subscription message will be described in further detail below with respect to FIG. 7. NWDAF 600 is an analytics function defined in 3GPP TS 29.520 that collects information regarding utilization of network functions and provides a subscription services for other nodes to be notified of the information it collects.

In line 2 of the message flow diagram, it is assumed that the network slice load information reporting condition(s) associated with the Eventsubscription_Subscribe message are met, and NWDAF 600 sends an Eventsubscription_Notify message to NSMF 402. The Eventsubscription_Notify message includes network-slice-related parameters, such as load information parameters, concerning the status of the network slice.

In line 3 of the message flow diagram, NSMF 402 sends an NSSI modification request message to NSSMF 404 to modify a network slice subnet instance based on the load information received from NWDAF 600. For example, if the Eventsubscription_Notify message indicated that the network slice is 80% loaded, the NSSI modification request may request allocation of additional computing resources for the network slice subnet instances that make up the network slice. Thus, in FIG. 6, network slice characteristics are dynamically monitored, and resource allocations are changed without requiring a message from the network slice service consumer. Because the resources associated with the network slice are dynamically updated transparently to the network slice service consumer, the consumer will not see any decrease in service quality and is not required to implement consumer-driven resource monitoring or updating to maintain service quality.

Figure 7:
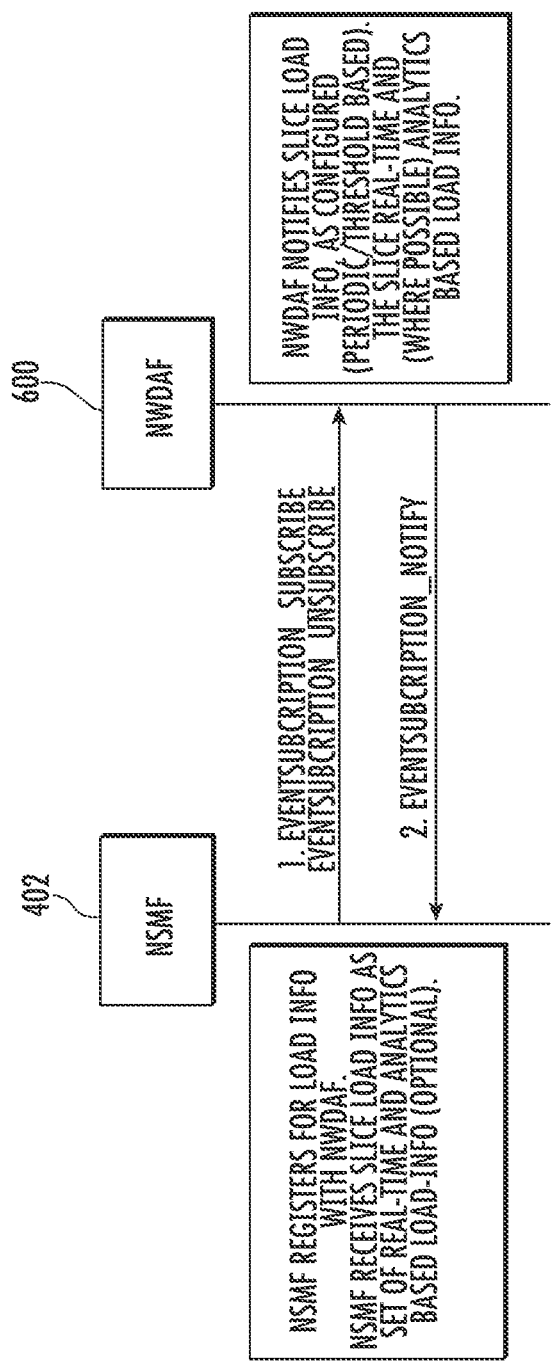
FIG. 7 is a message flow diagram illustrating exemplary messaging exchanged between a network slice management function and a network data analytics function in obtaining feedback information regarding utilization of a network slice.

FIG. 7 illustrates the subscription and event notification process between the NSMF and NWDAF in more detail. Referring to FIG. 7, in line 1 of the message flow diagram, NSMF 402 sends an Eventsubscription_Subscribe message to NWDAF 600. The Eventsubscription_Subscribe message registers NSMF 402 to receive load information from NWDAF 600 for network slice instances identified in the Eventsubscription_Subscribe message. The network slice or network slices may be identified by individual network slice identifier(s), a group network slice identifier, or a parameter that identifies all slices monitored by NWDAF 600. Other parameters that may be specified by the NSMF in the Eventsubscription_Subscribe message include data analytics parameters that are input to the analytics engine of NWDAF 600 to determine the trigger conditions that control dynamic network slice event reporting and the content of the reports to NSMF 402. Examples of data analytics parameters that may be included in the Eventsubscription_Subscribe message include:

Event Type {location, time of day, day of week}
    Data Selection Criteria {#sample, #interval, #both}
        Sample {Integer: #samples—e.g. max number of samples to allow per month}
        Interval {integer: value, e.g., hours, days, weeks}

Trigger Details
  Type—periodic/threshold
  Value—value of time interval/load threshold value
  Notification URI—URI to which notification messages are to be sent.

Thus, the above-described parameters that may be included in the Eventsubscription_Subscribe message enable NSMF 402 to obtain load information regarding a network slice or group of network slices and to define conditions under which network slice load information reports are generated.

In line 2 of the message flow diagram, in response to the Eventsubscripton_Subscribe message and one or more report triggering conditions defined in the message being met, NWDAF 600 generates and sends an Eventsubscription_Notify message to NSMF 402. The Eventsubscription_Notify message may include the following parameters:
  real-time load info (Mandatory) Integer 0 . . . 100
  analytics data set (Optional) 1 . . . N set/s (as shown below)
  {type: (day of week: Sunday). (location: mumbai)} set/s
  max load info (Optional) Integer 0 . . . 100
  avg load info (Optional) Integer 0 . . . 100

In the example above, the parameters included in the Eventsubscription_Notify message may include real time load information regarding a network slice. The real time load information may indicate a percentage of used (or unused) capacity of a network slice or network slice subnet along with a timestamp that indicates the time at which the network slice load information is recorded. The Eventsubscription_Notify message may also include one or more analytics data sets. In the example above, the analytics data sets include statistical load information per time period and/or location. For example, one analytics data set may include average, instantaneous, and maximum loading of a network slice instance or network slice subnet instance for a particular location during a day. The location may indicate the area served by the network slice instance or network slice subnet instance. Thus, the network slice and network slice subnet instance load information feedback received in FIG. 7 is generated independently of a request from a network slice service consumer and occurs dynamically after network slice creation when trigger conditions are met.

The NSMF with the NWDAF subscription interface described herein includes the following features:
1. Mechanism to include subscribe and notification methodology to have NSMF make dynamic network slice and slice subnet orchestration decisions based on current network criterion as well historical patterns (using analytics)
2. These notification inputs provide to the NSMF from the NWDAF may include:
  a. Current load or historical load on a network slice or a network slice subnet;
  b. Radio condition associated with the access network portion of a network slice or network slice subnet;
  c. Location specific updates of the load on a network slice or a network slice subnet;
  d. Time-based updates where load information for a network slice or network slice subnet is automatically updated by the NWDAF to the NSMF at intervals defined by the NSMF as part of the subscription to receive network slice or network slice subnet load information; and
  e. Traffic-based updates where the NWDAF automatically updates the NSMF of network slice or network slice subnet load information triggered by traffic conditions defined by the NSMF in the load information subscription.

The network slice load information feedback illustrated in FIG. 7 may be used to change resource allocations among network slice instances and network slice subnet instances. For example, if an Eventsubscription_Notify message indicates that a network slice instance is 80% loaded at the time a report is triggered, NSMF 402 may send a message to NSSMF 404 to allocate additional resources to the network slice subnet instances that make up the network slice instance. In another example, if the Eventsubscription_Notify message indicates that a network slice instance is only 20% loaded during a given time period, NSMF 402 may send a message to NSSMF 404 to deallocate some of the resources assigned to network slice subnet instances corresponding to the underutilized network slice instance.

Figure 8:
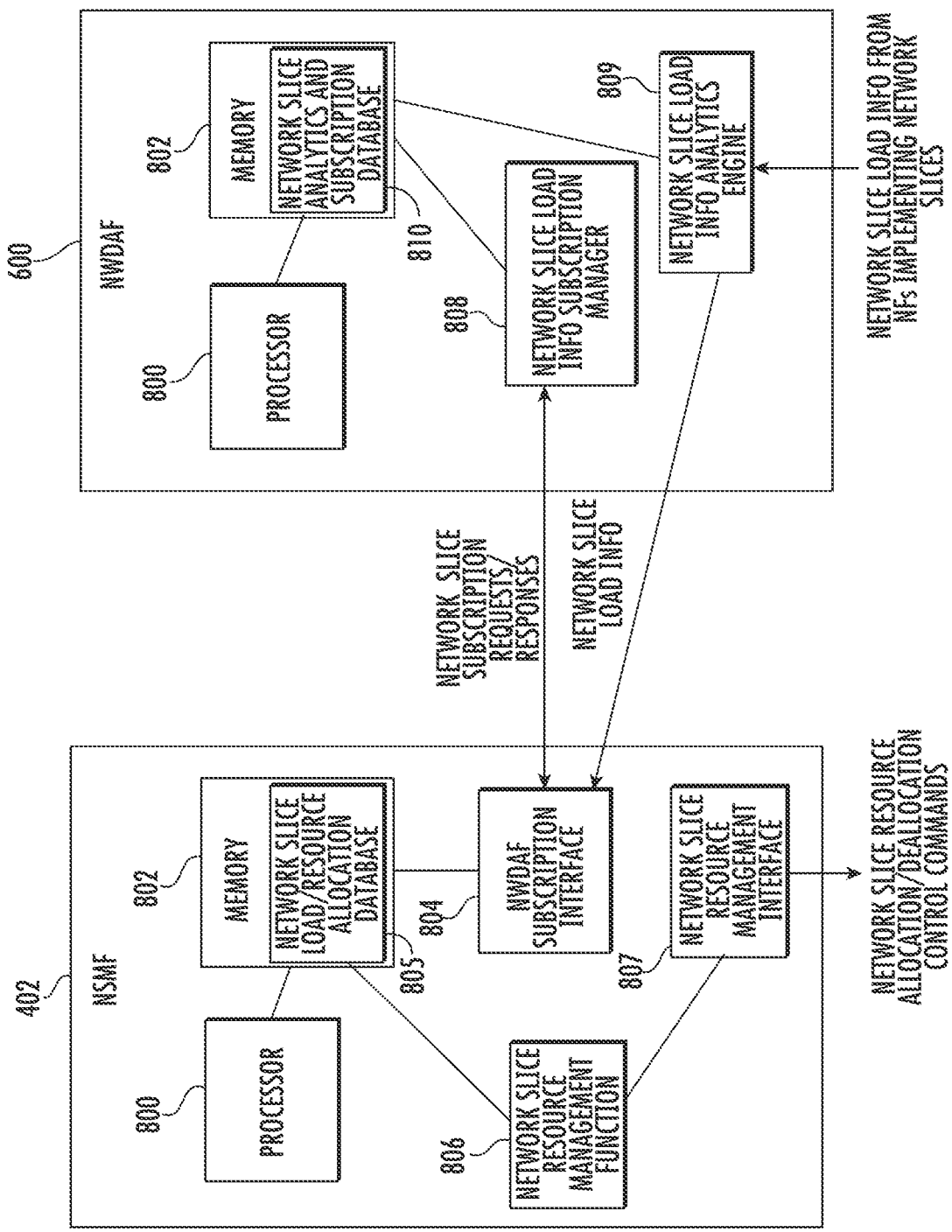
FIG. 8 is a block diagram illustrating an exemplary network slice management function and a network data analytics function suitable for dynamically monitoring network slice resource utilization and modifying network slice resource allocations based on the network slice utilization information.

FIG. 8 is a block diagram illustrating an NSMF and an NWDAF suitable for implementing the network slice load information feedback mechanism described herein. Referring to FIG. 8, NSMF 402 and NWDAF 600 each include at least one processor 800 and a memory 802. NSMF 402 includes an NWDAF subscription interface 804 that subscribes directly with NWDAF 600 to receive network slice load information, obtains the load information, and stores the load information in a network slice load/resource allocation database 805. NSMF further includes a network slice resource management function 806 that uses the load information in database 805 to issue network slice resource allocation and deallocation control commands via network slice resource management.

Providing an NSMF with a NWDAF subscription interface that subscribes directly with the NWDAF, defines criteria to trigger the sending of network slice load information, and uses the network slice load information to update network slice resource allocations dynamically is advantageous over static provisioning of network slices and even over implementations where the network slice load information is not tailored to criteria defined by the NSMF. For example, the NSMF described herein can define, as part of a network slice load information subscription, load information report triggering criteria that are based on a service level agreement with a communication service provider. If the NWDAF reports load information triggered by network conditions approaching criteria defined based on the SLA, the NSMF can maintain the service quality defined by the SLA independently and without the need for SLA monitoring by service consumers. In addition, a direct subscription interface between the NSMF and the NWDAF increases the likelihood that the load information reported to the NSMF will be current.

NWDAF 600 includes a network slice load information subscription manager 808. Network slice load information subscription manager 808 receives subscription requests from NSMF 402 and other consumers that wish to receive load information concerning network slices. Network slice load information subscription manager 808, after validating the subscribing entities, creates network slice load information subscriptions by storing records corresponding to the subscriptions in network slice analytics and subscriptions database 810. The records may identify the subscribing entities (e.g., NSMF 402), the network slice instances and network slice subnet instances to which each entity subscribes, and the trigger conditions that trigger reporting of network slice load information for each subscription.

A network slice load information analytics engine 809 receives load information from network functions (e.g., PCFs, SMFs, AMFs, etc.), performs analytics based on the load information, and stores results of the analytics and the load information in network slice analytics and subscription database 810.

When network slice load information analytics engine 809 receives load information for a network slice, network slice load information analytics engine 809 updates any records in database 810 with the network slice load information.

Network slice load information analytics engine 809 may continually evaluate network slice reporting conditions associated with records in database 810 to determine whether a network slice load information event reporting condition is met. When network slice load information analytics engine 809 determines that a network slice load information event reporting condition associated a network slice instance load information subscription from NSMF 402 has been met, network slice load information analytics engine 809 generates and sends a report with the requested load information to NSMF 402. NSMF 402 utilizes the load information to make network slice instance resource allocation and deallocation decisions.

It should be noted that while FIG. 8 illustrates network slice load information subscription manager 808 and network slice load information analytics engine 809 as separate functional blocks, their functionalities can be combined an implemented by a single logical or physical entity within NWDAF 600 without departing from the scope of the subject matter described herein.

Figure 9:
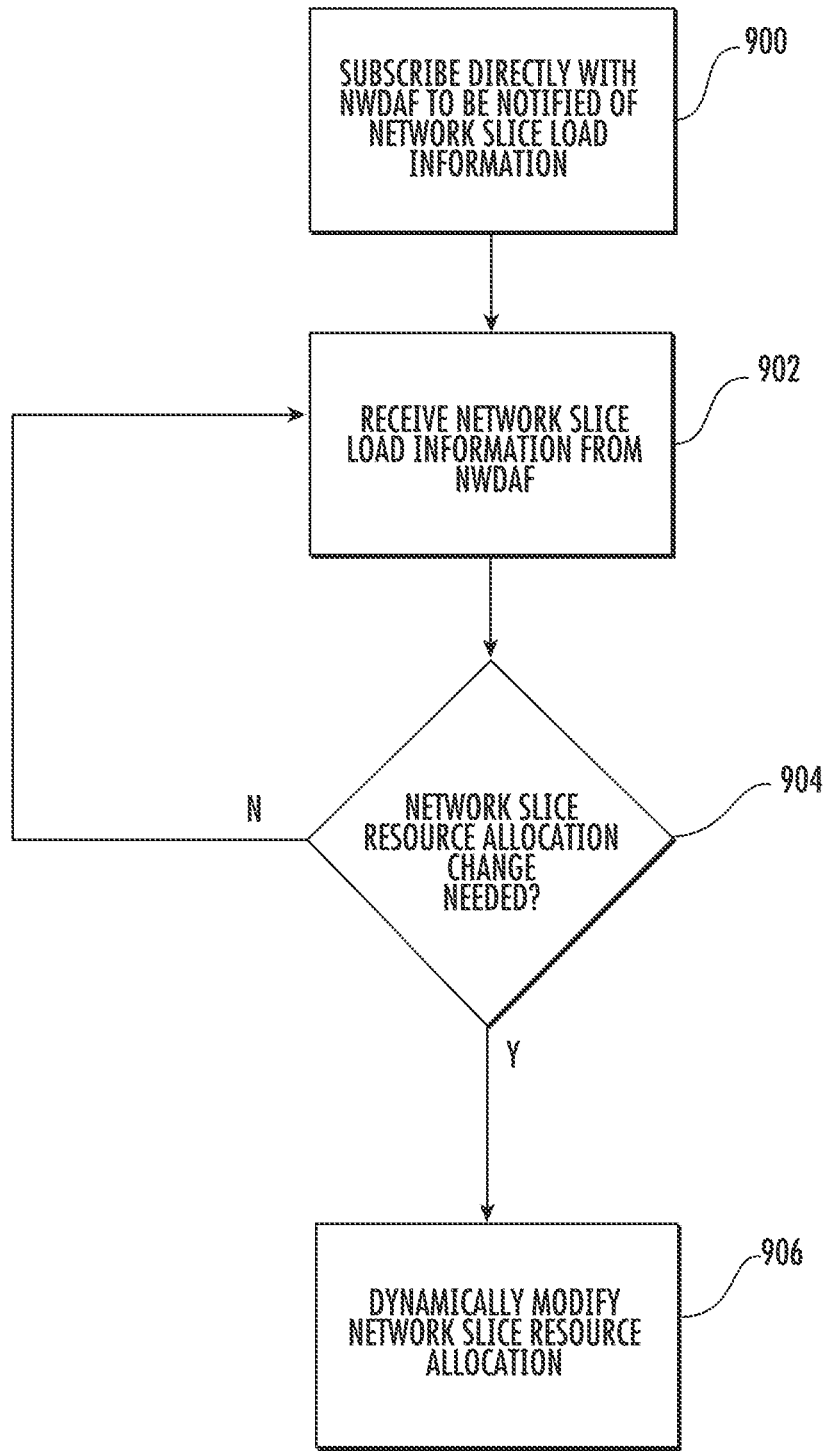
FIG. 9 is a flow chart illustrating an exemplary process for network slice management using a feedback mechanism.

FIG. 9 is a flow chart illustrating an exemplary process for providing and utilizing real time network slice load information feedback for network slice resource allocation. The steps illustrated in FIG. 9 may be implemented by NSMF 402. Referring to FIG. 9, in step 900, the process includes subscribing directly with the NWDAF to receive network slice load information. For example, NSMF 402 may transmit an Eventsubscription_Subscribe message to NWDAF 600 identifying one or more network slice instances about which NSMF 402 desires to receive load information. The Eventsubscription_Subscribe message may also include event type, data selection, and trigger information parameters, as described above. The Eventsubscription_Subscribe message may be transmitted by or via NWDAF subscription interface 804 of NSMF 402 illustrated in FIG. 8. The Eventsubscription_Subscribe message may include NSMF-defined criteria for triggering the reporting of real-time network slice load information by the NWDAF to the NSMF.

In step 902, the process includes receiving network slice load information from the NWDAF. For example, NSMF 402 may receive an Eventsubscription_Notify message from NWDAF 600 containing load information for network slice instances and network slice subnet instances identified in the Eventsubscription_Subscribe message. The load information may identify the percentage loading (or availability) of each network slice instance or subnet instance. The Eventsubscription_Notify message may be received by or via NWDAF subscription interface 804 of NSMF 402 illustrated in FIG. 8. The reporting may be triggered in response to the NSMF-defined criterion associated with the subscription being met, In step 904, the process includes determining whether a network slice resource allocation change is needed. In this step, NSMF 402 may compare the load information received in the Eventsubscription_Notify message with a threshold (such as an SLA-based threshold) and determine, based on a relationship between the load information and the threshold, whether a network slice resource allocation change is needed. For example, the network slice service provider may define a utilization threshold of 60% for a given network slice before a resource allocation change is triggered. If the load information for the network slice indicates that the network slice is currently 70% utilized, then NSMF 402 may determine that a network slice resource modification is needed. If the current loading of the network slice is less than the threshold, control returns to step 902 where the next load information concerning the network slice is received.

If NSMF 402 determines that a network slice resource modification is needed, control proceeds to step 906 where NSMF 402 dynamically modifies a network slice resource allocation. In one example, dynamically modifying a network slice resource allocation may include generating a sending a message to modify allocation of network slice resources. For example, if NSMF 402 determines that additional resources are needed for a given network slice instance, NSMF 402 may generate and send a message to NSSMF 404 to allocate additional resources to network slice subnets that make up a given network slice. Similarly, if NSMF 402 determines that resources assigned to a given network slice instance are underutilized, NSMF 402 may generate and send a message to NSSMF 404 to deallocate at least some of the resources assigned to network slice subnet instances that make up the network slice instance. In one example, the message sent to NSSMF 404 may be set by network slice resource management function 806 to NSSMF 404 via network slice resource management interface 807 of NSMF 402 illustrated in FIG. 8.

Figure 10:
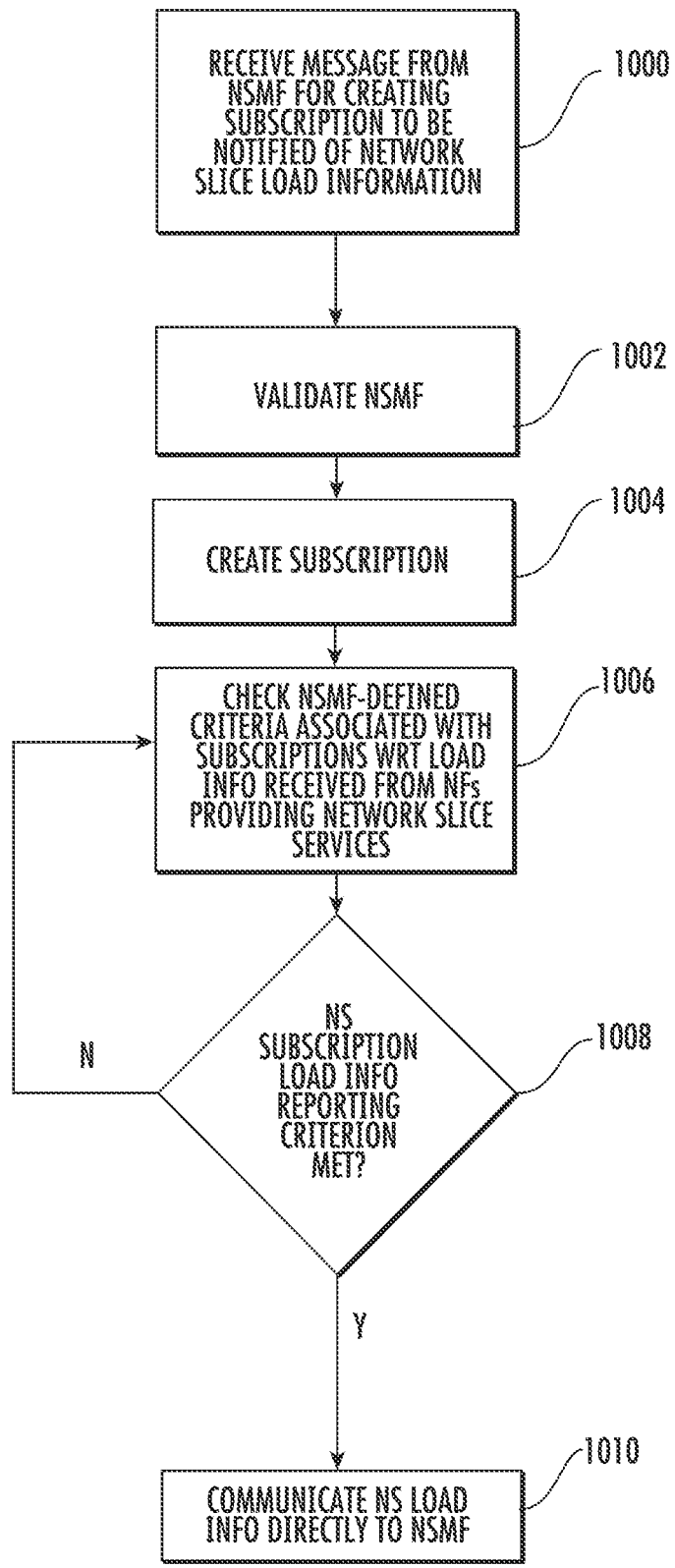
FIG. 10 is a flow chart illustrating exemplary steps performed by an NWDAF in providing network slice utilization feedback to an NSMF.

FIG. 10 is a flow chart illustrating an exemplary process for providing network slice feedback information to a network slice management function. The steps illustrated in FIG. 10 are implemented by NWDAF 600. Referring to FIG. 10, in step 1000, the process includes receiving a message from an NSMF for creating a subscription to be notified of network slice load information. For example, NWDAF 600 may receive an Eventsubscription_Subscribe message from NSMF 402. The Eventsubscription_Subscribe message may identify one or more network slice instances and/or subnet instances that NSMF 402 desires to monitor. The Eventsubscription_Subscribe message may also include event type, data selection, and trigger parameters, or other NSMF-defined network slice load information report triggering criteria, as described above. In one example, the Eventsubscription_Subscribe message may be received directly from NWDAF subscription interface 804 of NSMF 402 and by network slice load information subscription manager 808 of NWDAF 600 illustrated in FIG. 8.

In step 1002, the process includes validating the NSMF. For example, NWDAF 600 may access an internal authentication database to determine whether NSMF 402 is authorized to receive load information concerning the network slices identified in the Eventsubscription_Subscribe message. In the example illustrated in FIG. 10, it is assumed that the NSMF is successfully validated. In one example, the authentication may be performed by network slice load information subscription manager 808 using authentication data stored in network slice analytics and subscription database 810 of NWDAF 600 illustrated in FIG. 8.

In step 1004, the NWDAF creates a subscription corresponding to the parameters received from the NSMF in the Eventsubscription_Subscribe message. For example, network slice load information subscription manager 808 of NWDAF 600 may create an entry in network slice analytics and subscription database 810 that identifies the subscribing NSMF as well as the type of network slice load information event notifications and parameters that the NSMF desires to receive.

In step 1006, the process includes checking NSMF-defined criteria associated with the subscriptions with respect to load information obtained from network functions received from NFs implementing network slice services. For example, network slice load information analytics engine 809 of NWDAF 600 may receive load information from NFs, such as an AMF, SMF, NRF, UDM, NEF, etc., and may determine whether the load information applies to any subscriptions in database 810. If the received load information corresponds to a monitored network slice information subscription, control proceeds to step 1008 where it is determined whether a network slice load information reporting criterion associated with one of the subscriptions has been met. If a network slice load information reporting criterion associated with one of the subscriptions has been met, control proceeds to step 1010 where the network slice load information is communicated to the NSMF. For example, network slice load information analytics engine 809 of NWDAF 600 may generate an Eventsubscription_Notify message and send the message to NSMF 402. The Eventsubscription_Notify message may contain load information for the requested network slice or network slice subnet and may also contain metadata about the network slice load information. The metadata may include the location and the time that the network slice load information was collected.

If in step 1008 it is determined that a load information reporting criterion associated with one of the subscriptions has not been met, control returns to step 1006 where the subscriptions are checked with respect to load information from NFs providing network slice services.

The subject matter described herein provides one or more of the following features and/or benefits:
 The subject matter described herein introduces a feedback framework for the NSMF to effectively manage and optimize the network slices and network slice subnets.
 The feedback mechanism described herein enables the NSMF to maintain service level agreements (SLAs) required by the CSMF as per the service requirements of the CSMF.
 SLA terms can be used to define permissible capacity numbers for the NSMF to perform NSI resizing.
 The feedback mechanism provides for more efficient resource utilization by network slices.

The disclosure of each of the following references is incorporated herein by reference in its entirety:
1. 3GPP TS 23.501, "Technical Specification Group Services and System Aspects; System Architecture for the 5G System," (Release 16) V16.2.0 (2019-09).
2. 3GPP TS 23.502, "Technical Specification Group Services and System Aspects; Procedures for the 5G System," (Release 16) V16.2.0 (2019-09).
3. 3GPP TS 28.531, "Technical Specification Group Services and System Aspects; Management and orchestration; Provisioning," (Release 16) V16.3.0 (2019-09).
4. 3GPP TR 28.801, "Technical Specification Group Services and System Aspects; Telecommunication management; Study on management and orchestration of network slicing for next generation network," (Release 15) V15.1.0 (2018-01).
5. 3GPP TS 29.520, "Technical Specification Group Core Network and Terminals; 5G System; Network Data Analytics Services," Stage 3 (Release 16) V16.1.0 (2019-09).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for feedback-based network slice management, the method comprising:
   at a network slice management function (NSMF) separate from network slice service consumers and including at least one processor, wherein the NSMF is a $3^{rd}$ Generation Partnership Project (3GPP)-defined management function that exists in a management hierarchy between a communication service management function (CSMF) and a network slice subnet management function (NSSMF) and is responsible for management and orchestration of network slice instances:
   subscribing, by the NSMF, independently of monitoring requests from the network slice service consumers and via a network data analytics function (NWDAF) subscription interface of the NSMF, directly with the NWDAF to create a subscription to be notified of network slice load information and specifying, as part of the subscription, network slice load information report generation criteria defined by the NSMF, wherein subscribing directly with the NWDAF includes sending an Eventsubscription_Subscribe message from the NSMF to the NWDAF, the Eventsubscription_Subscribe message including data analytics parameters that serve as inputs to an analytics engine of the NWDAF to control dynamic network slice event reporting and content of the reports to the NSMF, where the data analytics parameters include a sample parameter for controlling a maximum number of samples to allow within a time period;
   receiving, directly from the NWDAF, via the NWDAF subscription interface of the NSMF and in response to the NSMF-defined network slice load information report triggering criteria being met, network slice load information;
   determining, based on the network slice load information, that a network slice resource allocation change is needed; and
   in response to determining that a network slice resource allocation change is needed, dynamically changing, by the NSMF and transparently to the network slice service consumers, the network slice resource allocation during operation of a network slice.

2. The method of claim 1 wherein the Eventsubscription_Subscribe message includes event type, data selection, and trigger parameters for defining network slice load events that trigger reporting of the network slice load information to the NSMF.

3. The method of claim 2 wherein the trigger parameters include parameters based on service level agreement (SLA) criteria.

4. The method of claim 1 wherein receiving the network slice load information includes receiving real time load information indicating utilization of a network slice after creation of the network slice and independently of monitoring by a network slice service consumer.

5. The method of claim 1 wherein determining that a network slice resource allocation change is needed includes comparing the network slice load information to an operator-defined threshold and determining that the network slice resource allocation change is needed if a network slice load level indicated by the network slice load information exceeds the threshold.

6. The method of claim 1 wherein dynamically updating the network slice resource allocation includes generating and sending a network slice subnet instance change request to a network slice subnet management function (NSSMF) to effect the change in the network slice resource allocation.

7. A system for feedback-based network slice management, the system comprising:
   a network slice management function (NSMF) separate from network slice service consumers and including at least one processor, wherein the NSMF is a $3^{rd}$ Generation Partnership Project (3GPP)-defined management function that exists in a management hierarchy between a communication service management function (CSMF) and a network slice subnet management function (NSSMF) and is responsible for management and orchestration of network slice instances;
   a network data analytics function (NWDAF) subscription interface implemented by the at least one processor for subscribing by the NSMF, independently of monitoring requests from the network slice service consumers and directly with an NWDAF to create a subscription to be notified of network slice load information and specifying, as part of the subscription, network slice load information report generation criteria defined by the NSMF, receiving, directly from the NWDAF, via the NWDAF subscription interface of the NSMF and in response to the NSMF-defined network slice load information report triggering criteria being met, network slice load information, wherein subscribing directly with the NWDAF includes sending an Eventsubscription_Subscribe message from the NSMF to the NWDAF, the Eventsubscription_Subscribe message including data analytics parameters that serve as inputs to an analytics engine of the NWDAF to control dynamic network slice event reporting and content of the reports to the NSMF, where the data analytics parameters include a sample parameter for controlling a maximum number of samples to allow within a time period; and
   a network slice resource manager implemented by the at least one processor for determining, based on the network slice load information, that a network slice resource allocation change is needed, and, in response to determining that a network slice resource allocation change is needed, dynamically changing, by the NSMF and transparently to the network slice service consumers, the network slice resource allocation during operation of a network slice.

8. The system of claim 7 wherein Eventsubscription_Subscribe message includes event type, data selection, and trigger parameters for defining network slice load events that trigger reporting of the network slice load information to the NSMF.

9. The system of claim 8 wherein the trigger parameters include parameters based on service level agreement (SLA) criteria.

10. The system of claim 7 wherein the NWDAF subscription interface is configured to receive real time load information indicating utilization of a network slice after creation of the network slice and independently of monitoring by a network slice service consumer.

11. The system of claim 7 wherein the network slice resource manager is configured to determine that a network slice resource allocation change is needed by comparing the network slice load information to an operator-defined threshold and determining that the network slice resource allocation change is needed if a network slice load level indicated by the network slice load information exceeds the threshold.

12. The system of claim 7 wherein the network slice resource manager is configured to dynamically update the network slice resource allocation by generating and sending a network slice subnet instance change request to a network slice subnet management function (NSSMF) to effect the change in the network slice resource allocation.

13. A non-transitory computer readable medium having stored thereon executable instructions that when executed by a processor of a computer control the computer to perform steps comprising:
   at a network slice management function (NSMF) separate from the network slice service consumers and including at least one processor, wherein the NSMF is a $3^{rd}$ Generation Partnership Project (3GPP)-defined management function that exists in a management hierarchy between a communication service management function (CSMF) and a network slice subnet management function (NSSMF) and is responsible for management and orchestration of network slice instances:
   subscribing, by the NSMF, independently of monitoring requests from the network slice service consumers and via a network data analytics function (NWDAF) subscription interface of a network slice management function (NSMF), directly with the NWDAF to create a subscription to be notified of network slice load information and specifying, as part of the subscription, network slice load information report generation criteria defined by the NSMF, wherein subscribing directly with the NWDAF includes sending an Eventsubscription_Subscribe message from the NSMF to the NWDAF, the Eventsubscription_Subscribe message including data analytics parameters that serve as inputs to an analytics engine of the NWDAF to control dynamic network slice event reporting and content of the reports to the NSMF, where the data analytics parameters include a sample parameter for controlling a maximum number of samples to allow within a time period;
   receiving, directly from the NWDAF, via the NWDAF subscription interface of the NSMF and in response to the NSMF-defined network slice load information report triggering criteria being met, network slice load information;
   determining, based on the network slice load information, that a network slice resource allocation change is needed; and
   in response to determining that a network slice resource allocation change is needed, dynamically changing, by the NSMF and transparently to the network slice service consumers, the network slice resource allocation during operation of a network slice.

* * * * *